United States Patent [19]
Alling

[11] Patent Number: 5,391,005
[45] Date of Patent: Feb. 21, 1995

[54] BEARING CAGE WITH DEPRESSED SLOT END

[75] Inventor: Richard L. Alling, Torrington, Conn.

[73] Assignee: The Torrington Company, Torrington, Conn.

[21] Appl. No.: 40,399

[22] Filed: Mar. 30, 1993

[51] Int. Cl.⁶ .......................... F16C 33/54; F16C 33/46
[52] U.S. Cl. ....................................... 384/575; 384/572; 384/580
[58] Field of Search ............... 384/470, 572, 574, 575, 384/576, 577, 578, 579, 580

[56] References Cited

U.S. PATENT DOCUMENTS

| | | | |
|---|---|---|---|
| 1,232,523 | 7/1917 | Folk | 384/580 |
| 1,870,892 | 8/1932 | Brown . | |
| 1,951,042 | 3/1934 | Walter . | |
| 3,042,464 | 7/1962 | Göthberg | 384/575 |
| 3,307,892 | 3/1967 | Eckstein | 384/572 |
| 3,365,775 | 1/1968 | Cavagnero et al. . | |
| 3,442,562 | 5/1969 | Schaeffler et al. | 384/575 |
| 4,192,560 | 3/1980 | Hartnett | 384/572 |
| 4,710,039 | 12/1987 | Huttner . | |

FOREIGN PATENT DOCUMENTS

| | | | |
|---|---|---|---|
| 851283 | 10/1952 | Germany | 384/572 |
| 1388645 | 3/1975 | United Kingdom | 384/572 |
| 684192 | 9/1979 | U.S.S.R. | 384/577 |

*Primary Examiner*—Thomas R. Hannon
*Attorney, Agent, or Firm*—John C. Bigler

[57] ABSTRACT

A flat strip of metal is formed to provide a depressed center relief portion between two edge portions. Depressions are formed in the two edge portions and center slots are pierced across the center relief portion such that roller receiving slots are formed with slot end depressions at both ends of the roller receiving slots. The partially formed bearing cage is then formed into a circular hoop such that the edge portions form rings at the axial ends of the circular hoop. The resulting roller bearing cage of the present invention may also be formed by other methods.

8 Claims, 3 Drawing Sheets

BEARING CAGE WITH DEPRESSED SLOT END

BACKGROUND OF THE INVENTION

This invention relates generally to roller bearing cages and, more particularly, to roller bearing cages of "sigma" configuration.

Roller bearings commonly employ separators, retainers or cages to maintain separation and alignment of the rollers. Although the terms are frequently used interchangeably, the term "cage" is often used to describe a device that retains the rollers both radially and axially. Thus, a roller bearing cage prevents rollers from moving axially or radially out of the cage, allowing the cage and rollers to be handled as a bearing subassembly.

One particular type of roller bearing cage is known as a sigma cage. As illustrated in FIG. 1, a typical sigma cage 10 has annular end rims 12 and 14, axially spaced apart along a common axis, joined together by crossbars 16 to form slots 18 for receiving rollers, not shown. Crossbars 16 have a central portion 20 offset radially inwardly from laterally outward portions 22 and 24 such that, when viewed in longitudinal section, end rims 12 and 14 and crossbars 16 resemble the Greek letter "sigma".

End rims 12 and 14 extend radially as end flanges 26 and 28, respectively. End flanges 26 and 28 provide stop surfaces which assist slots 18 to ensure that axial movement of the rollers is restricted. Edge surfaces on central portion 20 prevent radially inward movement of the rollers and edge surfaces of laterally outward portions 22 and 24 prevent radially outward movement of the rollers.

In some applications, a significant axial offset is required between the roller pockets (slots) and the end flanges of the cage. Such offset materially affects the axial containment of the rollers because the end flanges no longer provide stop surfaces proximate to the slots. As a result, roller loss can occur during handling of the cage before installation or upon installation of the bearing in the housing.

The foregoing illustrates limitations known to exist in present roller bearing cages of sigma configuration. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method for forming a roller bearing cage with depressed slot ends. A flat strip of metal is formed to provide a depressed center relief portion between two edge portions. Depressions are formed in the two edge portions and center slots are pierced across the center relief portion such that roller receiving slots are formed with slot end depressions at both ends of the roller receiving slots. The partially formed bearing cage is then formed into a circular hoop such that the edge portions form rings at the axial ends of the circular hoop.

In another aspect of the present invention, a roller bearing cage is provided having axially spaced end rims. Crossbars join the end rims such that roller receiving slots are formed, the crossbars having a central portion radially offset with respect to laterally outward portions such that a roller is retained in the radial directions. Radially offset rim portions are located between the crossbars such that a roller within one of the roller receiving slots is retained in each axial direction by engagement with one radially offset rim portion at each end of the roller receiving slot.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 2:
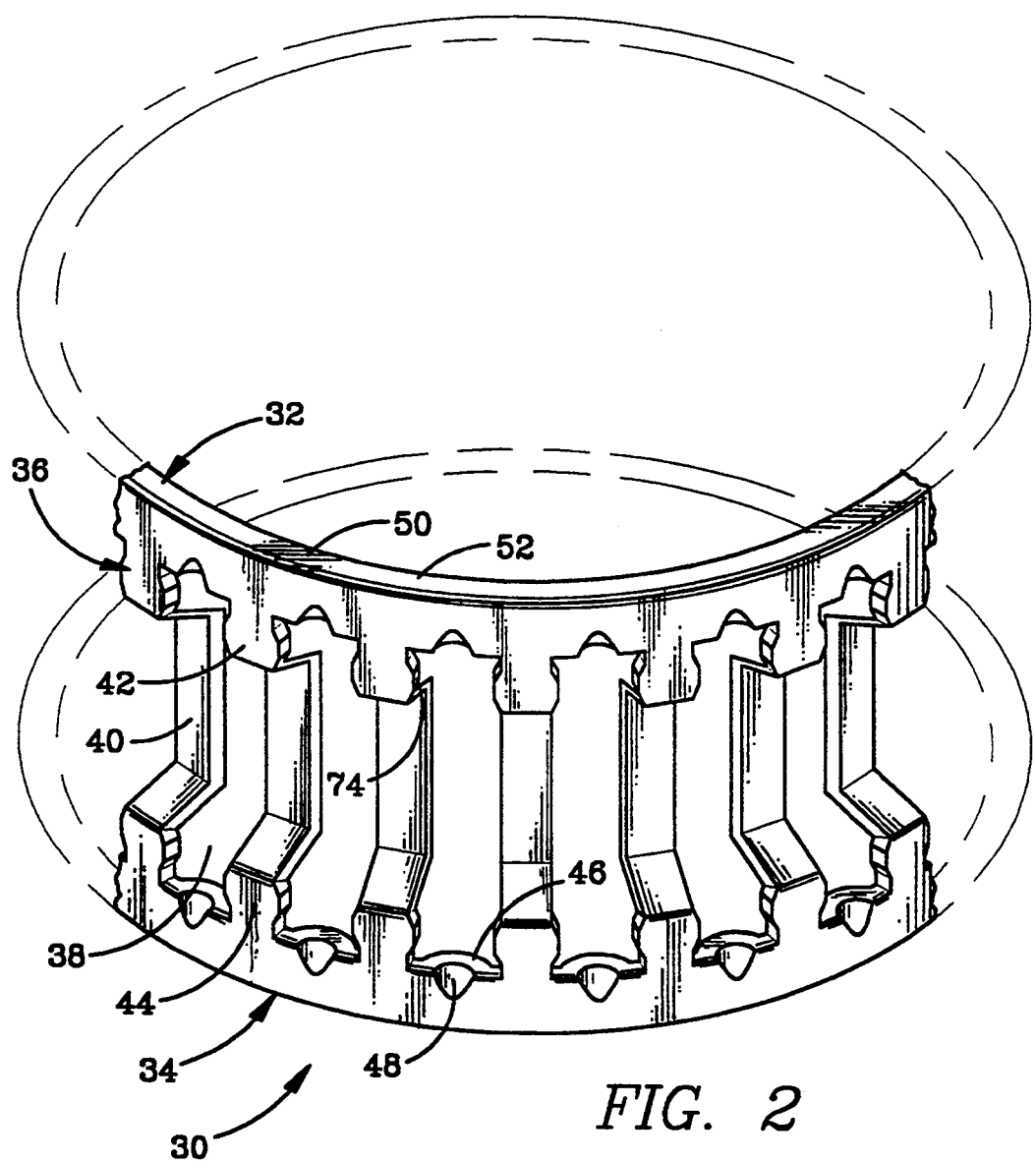
FIG. 2 is an isometric view illustrating an embodiment of the roller bearing cage of the present invention.

Referring now to the drawings, FIG. 2 illustrates a preferred embodiment of roller bearing cage 30 of the present invention having annular end rims 32 and 34, axially spaced apart along a common axis, joined together by crossbars 36 to form slots 38 for receiving rollers, not shown. Crossbars 36 have a central portion 40 offset radially inwardly from laterally outward portions 42 and 44. Cage 30 is considered a sigma cage because end rims 32 and 34 and crossbars 36 suggest the Greek letter "sigma" when the cage is viewed in longitudinal section.

Figure 1:
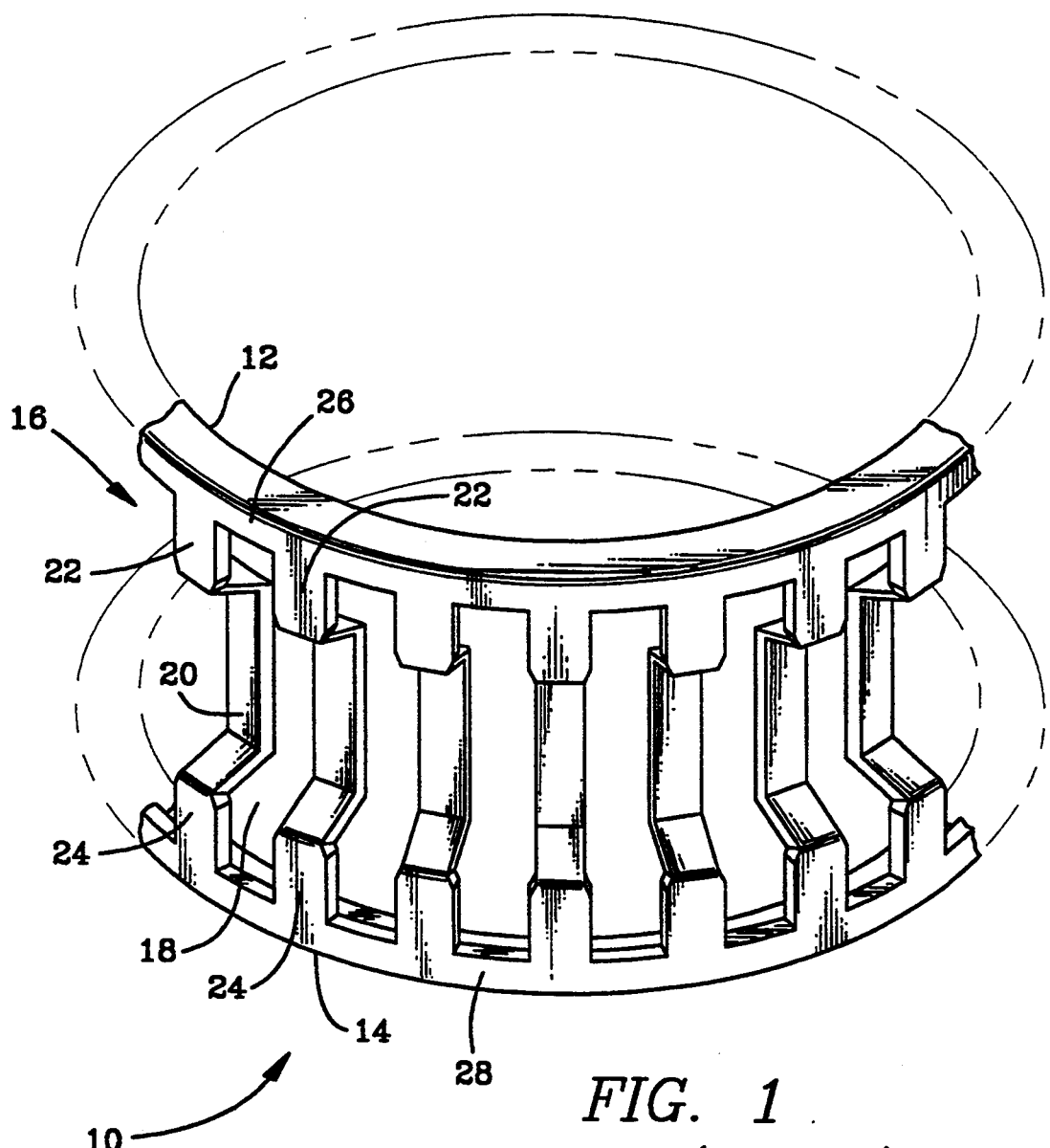
FIG. 1 is an isometric view illustrating a prior art roller bearing sigma cage.

Unlike the roller bearing cage of FIG. 1, roller bearing cage 30 has depressed slot ends designed to abut end surfaces of bearing rollers received within slots 38. Abutment surfaces 46 are formed by periodic depressions 48, one at each end of roller receiving slots 38, to prevent escape of the bearing rollers, especially in the absence of close proximity bearing cage flanges. Specifically, axial movement of the bearing rollers in both axial directions is limited by engagement of abutment surfaces 46 by the bearing rollers.

In the particular embodiment shown, abutment surfaces 46 have a curved profile, curved with a circular arc or otherwise, along a transverse section of bearing cage 30. Depressions 48 are dimple-like recesses having a substantially angular longitudinal section and a substantially conical configuration. However, depressions 48 may be of various shape, depending on the shape of tooling used to form the recesses, as described below.

End rims 32 and 34 comprise axially extending portions side 50 and flange portions 52 extending radially inwardly at the axially outward ends of axially extending side portions 50. Depressions 48 are formed within axially extending side portions 50 at locations between crossbars 36. Abutment surfaces 46 are radially offset rim portions forming ends of slots 38. End rims 32 and 34 and crossbars 36 are formed from a single sheet of steel or other metal and have substantially the same thickness.

Figure 5:
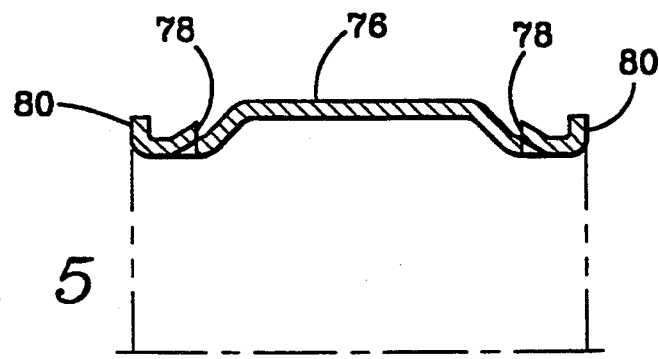
FIG. 5 is a sectional view of a roller bearing cage illustrating a second embodiment of the present invention.

As illustrated in FIG. 2, central portions 40 of crossbars 36 and abutment surfaces 46 are offset radially inwardly relative to laterally outward portions 42 and 44 of crossbars 36. However, the present invention is not limited to that configuration and may also be utilized to provide an inverted sigma bearing cage, illustrated in FIG. 5, in which central portions 76 and abutment portions 78 are offset radially outwardly. Similarly, flange portions 80 may extend radially outwardly rather than radially inwardly or may be omitted.

Figure 3:
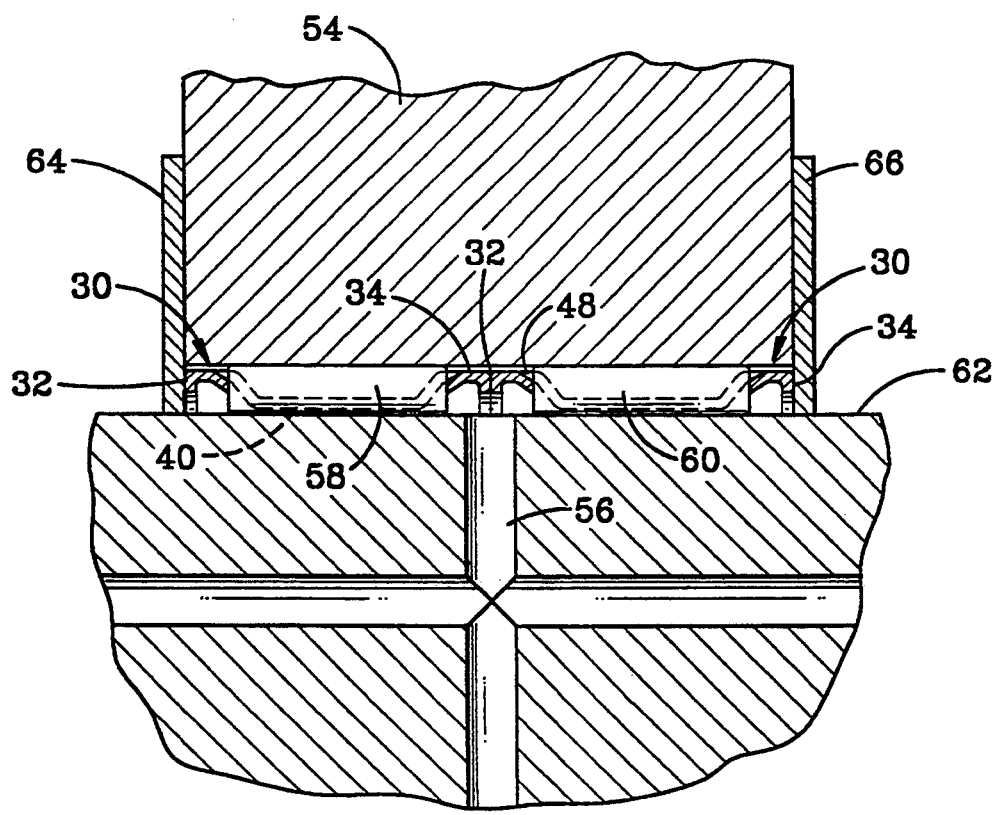
FIG. 3 is a sectional view of two roller bearing cages of FIG. 2 as installed in an elongated bearing housing having a cross drilled lubrication hole.

FIG. 3 illustrates an example requiring a significant offset of the roller receiving slots from the bearing flanges. Two roller bearing cages 30, shown in longitudinal section, are installed in an elongated bearing housing 54 having a cross drilled lubrication hole 56. Depressions 48 of end rims 32 and 34 allow two roller cage bearings to maintain proper axial location of rollers 58 and 60 without roller interference to the breakout location of lubrication hole 56 on load bearing shaft 62.

End washers 64 and 66 mounted on bearing housing 54 engage outward flanges of roller bearing cages 30 to limit outward axial movement of the cages. Inward flanges of roller bearing cages 30 overlie lubrication hole 56 and abut each other to limit inward axial movement of the cages. Central portions 40 of crossbars 36 separate rollers 58 and 60 circumferentially and cooperate with outward portions 42 (FIG. 2) to contain the rollers during handling and installation.

The preferred method of manufacturing roller bearing cage 30 is by flat blank, wrap, and weld, using multislide techniques. Flat coil stock of uniform section is pressed to form a depressed center relief portion between two edge portions. Pairs of slot end relief openings are pierced in the edge portions, and forming punches are seated against the laterally outward edges of the slot end relief openings, thereby forming angled slot end depressions 48.

Center slots are then pierced across the center relief portion and between each pair of slot end relief openings to provide the remaining perimeter of slots 38 such that depressions 48 are at the ends of slots 38. Strip edge gutting and flange forming may be used to trim and shape edges of the resulting cage blank. The cage blank is cut to a predetermined length by a block cut from the formed strip. The completed blank is wrapped to a 360 degree circular hoop and welded such that the edge portions form rings at the axial ends of the resulting cage.

Figure 4:
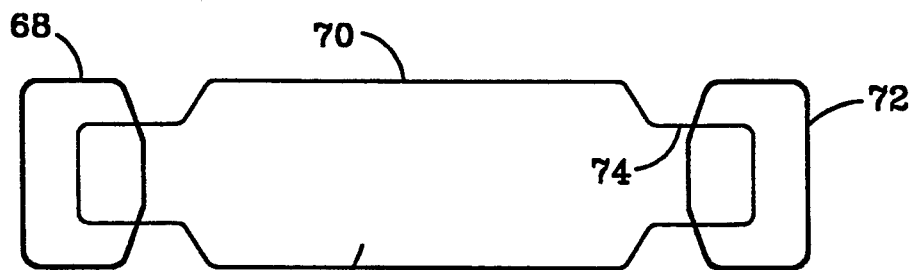
FIG. 4 is a diagram illustrating outlines of multiple punches that may be used to pierce slots of the bearing cage of FIG. 2.

FIG. 4 illustrates outlines and relative positions of multiple punches that may be used to pierce slots 38 according to the method just described. Heavier outlines 68 and 70 represent the shape of one pair of slot end relief openings pierced in the edge portions of the flat strip. Light outline 72 represents the shape of tooling used to pierce the center slots across the slot end relief openings.

As shown by the positions illustrated, the opening pierced by the center slot punch blends with the slot end relief openings, even if a slight misalignment of the punches occurs. The separate cutting of the slot end relief openings avoids distortion to the slot that might occur during pressing to form depressions 48. Overlapping of the punches results in circumferentially extending trapezoidal shaped tabs 74 (also in FIG. 2) which extend into the roller receiving slots and assist in controlling radially outward movement of the rollers.

Alternatively, depressions 48 may be formed by pressing a "dimple" or recess in the edge portions of the metal strip without piercing of slot end relief openings. The full perimeter of slots 38 would then be pierced such that a portion of the dimple remains, thereby providing depressions 48. That method ensures a square profile (in longitudinal section) abutment surface 46 which gives maximum contact with the ends of the rollers; however, tool maintenance with that alternative method may be more difficult.

Other variations in the method of manufacturing cage 30 or the inverted sigma bearing cage are included in the present invention. Depressions 48 may be formed either before or after piercing of the center slots. Depressions 48 and slots 38 may also be formed and pierced simultaneously or may be accomplished by a single tool. Strip edge gutting, flanging and welding steps may be added or omitted, as desired. Joining ends of the circular hoop may be by other means than welding or may be omitted.

From the above description, it will be apparent that the present invention provides a solution to the end containment problem in conventional sigma bearing cages which results in roller loss during handling and upon bearing installation, especially when a significant offset is required between the rollers and the end flanges. Axial emergence of the bearing rollers is prevented by roller contact with the depressed slot end to maintain proper location of the rollers.

Having described the invention, what is claimed is:

1. A roller bearing cage comprising:
   first and second end rims axially spaced apart with respect to a common axis, each of the end rims having an axially outward end, an axially extending side portion, and a plurality of periodic depressions axially spaced from the outward ends; and
   crossbars joining the first and second end rims such that roller receiving slots are formed therebetween, the crossbars having laterally outward portions and a central portion radially offset with respect to the laterally outward portions;
   the crossbars being configured such that a roller within one of the roller receiving slots is retained in the radial directions by engagement with the central portion and with the laterally outward portions;
   the periodic depressions being located between the crossbars, one at each end of the roller receiving slots, such that a roller within one of the roller receiving slots is retained in the axial directions by engagement with the periodic depressions at each end of the roller receiving slot.

2. The roller bearing cage according to claim 1, wherein the end rims and crossbars are formed from a single sheet of metal and have substantially the same thickness.

3. The roller bearing cage according to claim 1, wherein the periodic depressions include surfaces having an angled profile in longitudinal section.

4. The roller bearing cage according to claim 1, wherein the periodic depressions include roller engaging abutment surfaces having a curved profile in transverse section.

5. The roller bearing cage according to claim 1, wherein the central portion and the periodic depressions are both offset radially inwardly with respect to the side portions.

6. The roller bearing cage according to claim 1, wherein the central portion and the periodic depressions are both offset radially outwardly with respect to the side portions.

7. The roller bearing cage according to claim 1, wherein the laterally outward portions of the crossbars include at least one tab extending circumferentially into the roller receiving slots.

8. The roller bearing cage according to claim 1, wherein each end rim includes a radially extending flange portion at the axially outward ends of the axially extending side portions of the end rims.

* * * * *